United States Patent [19]

Rossides

[11] Patent Number: 5,085,435
[45] Date of Patent: Feb. 4, 1992

[54] METHOD OF USING A RANDOM NUMBER SUPPLIER FOR THE PURPOSE OF REDUCING CURRENCY HANDLING

[76] Inventor: Michael T. Rossides, 1341 Kennedy St., NW., Washington, D.C. 20011

[21] Appl. No.: 609,063

[22] Filed: Nov. 7, 1990

Related U.S. Application Data

[63] Continuation-in-part of Ser. No. 571,126, Aug. 22, 1990, abandoned.

[51] Int. Cl.⁵ .......................... A63F 9/00; G06F 15/28
[52] U.S. Cl. ............................. 273/138 A; 273/138 R; 273/460; 364/412; 364/405; 902/23
[58] Field of Search ............... 273/138 A, 138 R, 1 F; 364/412, 405; 902/23; 194/211, 219, 230, 242

[56] References Cited

U.S. PATENT DOCUMENTS

| | | | |
|---|---|---|---|
| 3,770,269 | 11/1973 | Elder | 273/138 A |
| 3,852,576 | 12/1974 | Rudd | 273/138 A |
| 4,206,920 | 6/1980 | Weatherford | 273/138 A |
| 4,815,741 | 3/1989 | Small | 273/138 A |
| 4,854,590 | 8/1989 | Jolliff | 273/138 A |
| 4,948,134 | 8/1990 | Suttle et al. | 273/274 |

FOREIGN PATENT DOCUMENTS 2123702 2/1984 United Kingdom ........... 273/138 A

*Primary Examiner*—Benjamin Layno
*Attorney, Agent, or Firm*—Beveridge, DeGrandi & Weilacher

[57] ABSTRACT

Disclosed is the use of a Random Number Supplier to execute bets in an Expected Value Payment Method for the purpose of reducing the expected per unit costs incurred in paying and/or receiving a given amount of a commodity. An expected Value Payment Method uses bets to reduce expected per unit costs in two ways.

First, expected per unit costs can be reduced for the payer and/or receiver of a commodity by giving the receiver a chance to win a greater amount of the commodity than a given amount, the greater amount having a lower per unit cost than the given amount which was originally to be paid and received. Second, in special situations, certain businesses can offer customers who bet to win a given amount of a commodity a better expected price for that amount than the price offered to customers paying conventionally for that same amount.

Also disclosed are Expected Value Payment Execution Systems that make an Expected Value Payment Method practical by preventing cheating in Expected Value Payment bets.

1 Claim, 4 Drawing Sheets

METHOD OF USING A RANDOM NUMBER SUPPLIER FOR THE PURPOSE OF REDUCING CURRENCY HANDLING

This application is a continuation-in-part of application Ser. No. 07/571/126, filed Aug. 22, 1990, now abandoned.

BACKGROUND OF THE INVENTION

As far as the inventor knows, the only relevant prior art is the inventor's related patent application entitled "Use of a Random Number Supplier (RNS) in an Expected Value Payment Method for the Purpose of Reducing Currency Handling Requirement", Ser. No. 07/571,126. This application is a continuation-in-parts of application Ser. No. 07/571,126 now abandoned.

This application discloses a more general use of an RNS, said use being new as far as the inventor knows. Hence, the inventor does not know of any other prior art concerning the use of an RNS except to say that RNS's have been used throughout history to decide bets.

The application also describes means and methods for preventing cheating in expected payment bets. These means and methods include those disclosed in the previously mentioned patent. New means and methods are disclosed as well.

SUMMARY OF THE INVENTION

The object of the invention is to make practical an Expected Value Payment Method for the purpose of reducing the expected per unit costs incurred in paying and/or receiving a given amount of a commodity. An Expected Value Payment Method requires a Random Number Supplier or the equivalent. Furthermore, it requires, in most cases, Expected Value Payment Execution Systems which prevent cheating in expected value payment bets. The invention thus includes Expected Value Payment Execution Systems with a Random Number Supplier and other elements for preventing cheating.

DESCRIPTION OF THE PREFERRED EMBODIMENTS

"Commodity" and "Payment" Defined

Figure 1:
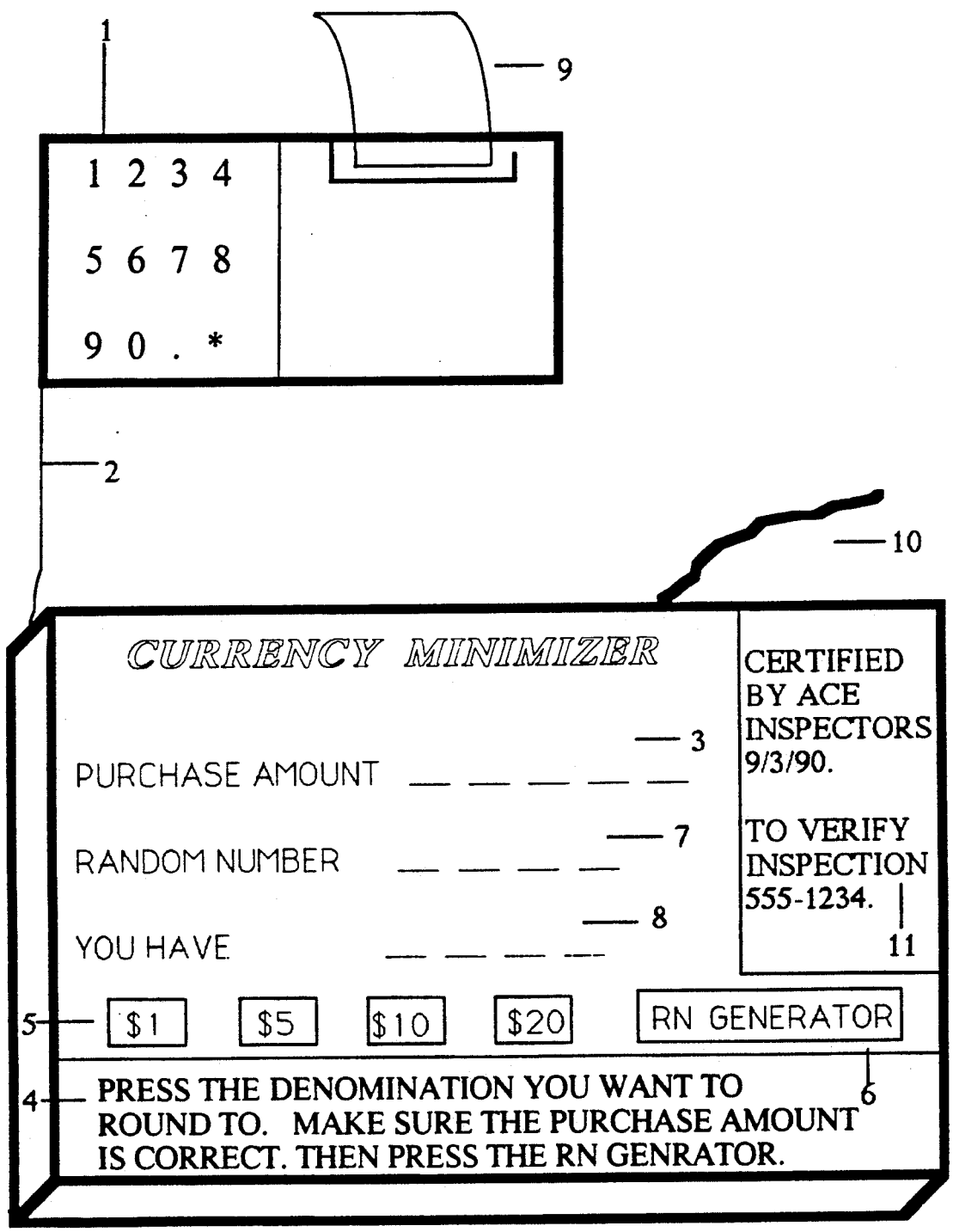
FIG. 1) A device allowing purchases to be rounded, by betting, to the denomination of a customer's choice.

In this application "commodity" does not refer to all commodities but instead to those that are quantifiable and can be used as payment. To use as payment means that one party gives another party ownership of or rights to use a commodity.

Clearly, "payment" here does not refer just to the obvious case of payment with money because money is by no means the only commodity used as payment. The more general concept of payment is most readily seen in barter. In barter, both commodities in an exchange are payment. Money is an invention that has taken the place of one of the sides in a barter exchange. For example, if one buys a mug at a store, one pays the store say, $5.13, and the store pays one the mug. The mug is payment for the $5.13. Of course a payment does not have to be part of an exchange. One may make a payment and get nothing quantifiable or definite in return, for example, when one pays taxes or gives a gift.

"Costs of Paying and Receiving a Commodity" Defined

In this application, the term "the costs of paying and receiving a commodity" is a very inclusive term which refers to the great variety of costs that can be involved when a commodity is used as payment. The term is broad because costs vary greatly with the commodity in question and differ for the Payer and the Receiver.

The most obvious cost is for the Receiver of a commodity when that commodity is bought by the Receiver. The obvious cost then for the Receiver is the amount of money it takes to buy the commodity (this cost is the only cost that the Receiver pays to the Payer). Other costs for the Receiver can be time costs. For example, when a store is receiving money, the store clerk requires time to handle the money. Information costs are another type of Receiver cost i.e. a party that receives, say, stock often records that fact.

(A Receiver can pay for a commodity with a commodity other than money. This case is a barter exchange. Yet, in this application, for simplicity's sake, we will assume in exchanges that money is the second side of an exchange.)

The Payer's costs in this application DO NOT refer to the Payer's total costs tied up in a commodity. They do not, for example, refer to production costs. They refer only to the costs that are incurred in the paying of a commodity. To name a few, these costs can include the time spent making the payment, the overhead assigned to the payment and the costs of recording the payment.

Many costs of paying and receiving a commodity are hidden. For example, a stockholder receives money in the form of a dividend check. He or she does not see the cost the Payer incurred in writing the check. Likewise, a customer waiting in line incurs a time cost which is rarely factored into the price of the commodity.

"Per Unit Cost" (PUC) Defined

The per unit cost (PUC) of paying a given amount of a commodity is: The cost of paying the amount divided by the number of units in the amount.

Likewise, the PUC of receiving a given amount of a commodity is: the cost of receiving the amount divided by the number of units in the amount.

The trick is to decide what these cost include. There is no formula. For example, a person might receive 5 pens costing $10. The PUC of these pens is then $2. On the other hand, the Receiver can factor in other costs such as time costs, transportation costs, and opportunity costs. This would make the cost of receiving the 5 pens:

($10+time cost+transportation cost+opportunity cost) divided by 5.

The Per Unit Cost of Paying and Receiving a Commodity Often Varies With the Amount of the Commodity Paid and Received This principle is very general as the examples below demonstrate.

Items Bought In Wholesale vs. Retail Amounts

If a person buys, say, 5 pens at a time, the cost will usually be more per pen than if he or she buys 1000 pens at a time.

Money Paid by Many Small Checks vs. One Big Check

A company can pay a person $10 by sending that person ten $1 checks. However, it is cheaper per dollar (for both parties) to pay with one $10 check because there are costs involved in writing, cashing, recording and processing checks.

Stocks Bought In Odd Lots vs. 100 Share Lots

Stocks which are traded in amounts of less than 100 shares are called odd lots. Traders usually charge a premium to trade odd lots. It is therefore cheaper, per unit of stock, to trade in even lots.

Money Paid By Coins (in the U.S.) vs. Bills

The costs for both customer and stores of handling coins are mainly time costs. It is less costly for both parties if cash purchases involve no coins but instead are rounded to the dollar.

"Expected Value Payment Method" (EVPM) Defined

An Expected Value Payment Method (EVPM) is a method of payment whereby the Payer and Receiver of a commodity enter into a bet such that the Receiver may or may not receive the commodity depending on whether the Receiver wins the bet or not.

There are three values that determine a bet:
WHAT CAN BE WON,
THE CHANCE OF WINNING,
THE COST PAID FOR HAVING THE CHANCE OF WINNING.

The average amount one will win, if one repeats a bet an infinite number of times, is called the Expected Value (EV) of the bet. It is calculated by multiplying WHAT CAN BE WON by THE CHANCE OF WINNING.

In an EVPM, the EV is set precisely.

And, in an EVPM, the bet is decided by a Random Number Supplier or the equivalent.

An Expected Value Payment Method Used To Reduce The Expected Per Unit Costs Incurred In Paying and/or Receiving A Given Amount of a Commodity There are two ways that an EVPM can reduce expected per unit costs. The more general way will be described first.

An Expected Value Payment Method Used to Reduce The Expected Per Unit Costs Incurred In Paying and/or Receiving A Given Amount of a Commodity By Giving the Receiver a Chance to Win a Greater Amount of the Commodity Having a More Favorable Per Unit Cost Than the Given Amount Which the Receiver Was Originally Supposed to Receive Assume one party is originally supposed to pay another party a given amount of a commodity. Call the two parties the Payer and the Receiver. Further call the given amount the Original Amount (OA).

There is a certain PUC at the OA for both the Payer and Receiver.

Also assume the PUC is lower, for one or both of the parties, when certain greater amount of the commodity is paid. Let us call this greater amount the Better Amount (BA).

It would be better for the Payer and/or the Receiver if the Original Amount (OA) had the Per Unit Cost (PUC) of the Better Amount (BA).

An EVPM can "convert" the OA's PUC to the BA's PUC.

A bet can be set up between the two parties in a commodity payment such that:
The Receiver Can Win the BA
The Receiver's EV equals the OA
The Receiver's Cost for Having the Chance to Win the BA is set so that the Expected PUC for the Receiver equals the PUC of the BA.

(The Payer's Expected PUC will also equal the PUC of the BA.)

In the case of exchanges, where the Receiver pays something to the Payer for the OA, it is possible to set up a bet such that:
The Receiver's Cost Paid to the Payer For the Chance of Winning is equal to the Receiver's Cost Paid at the OA and
The Receiver's EV Is an Amount Greater than the OA making the Expected PUC equal to the PUC of the BA.

(Again, the Payer's Expected PUC also equals the PUC of the BA.)

The examples below illustrate.

EXAMPLES (Technically, the Expected PUC must include the cost of making a bet. For simplicity's sake, we are leaving this out of the calculations. Further, the Expected PUC should include tax considerations in certain cases. Taxes are also being left out for simplicity's sake.)

Purchasing Pens

Let us assume that a store can buy 50 pens from a distributor for $100. The store's PUC then is $2 per pen.

Let us further assume that the store can buy 500 pens for $500. The store's PUC for this amount is $1 per pen.

The store manager decides that he would rather not pay $2 per pen because he will make little profit and attract few customers. He would like to get pens at the $1 rate but he does not have $500 in his budget to spend on pens. Therefore, he feels the best investment is to enter into a bet with the distributor such that:

The store pays $100
The store can win 500 pens (which cost $500) and
The store's chance of winning is 1/5.

The store's EV then is 100 pens; hence the Expected PUC is $1 per pen.

(The distributor cannot complain because, according to basic probability theory, his expected revenue for those pens is $500. To see this fact, assume five bets of the type described above were made and the store won one bet and lost four (which is what the odds are). The store would get 500 pens from winning one bet and the distributor would get $500 from getting $100 in five bets. Over an infinite number of bets, this is what would happen on average.)

Odd Lots of Stock

Let us assume that you want to buy 80 shares of a certain stock. You call your broker and he says, "If you buy 80 shares, the share price will be $1.60.

I recommend you buy 100 shares instead. The price then will be 1.50 per share."

You say, "But I've only got $128.00 to invest."

The broker then says, "You can make the following bet:

You pay the $128.00

You can win the 100 shares (which cost $150.00) and

You have a 128/150 chance of winning.

The expected number of shares you receive is 85 and $\frac{1}{3}$ making the expected price per share $1.50.

Or, if you like, you can make a bet such that:

You have to pay $120.00

You can win the 100 shares

Your chance of winning will be 80/100

Your expected value will be 80 shares so your expected price per share will be $1.50."

Data-Base Time

Imagine that a student wants to do some research through a database. The database company's rates are:

$30 per hour if one hour is used and $10 per hour if 5 hours are used.

The student does not want to pay the $30 per hour rate but is willing to make a bet to try to get the $10 rate. The student must decide how much to pay to try to win and how many hours to try to win. Imagine then that a bet is set such that:

The student pays $20

The student can win 5 hours of data-base time (which cost $50)

The student's chance of winning is 2/5.

The student's EV is 2 hours; hence the Expected PUC is $10 per hour.

Tollbooth

Consider a typical tollbooth into which drivers pay $1 for a "pass through". The driver incurs a time cost for each pass through. There is also a time cost for the toll authority in handling the payments. In fact, the receiver in this case is not the driver, it is the toll authority and the commodity received is money and the unit is $1. This case is a good example of a large payer cost. In fact, it is important to note that while we can say that the PUC of a "pass through" is lowered, that is actually because the cost of paying $1 is lowered.

The per unit time costs would be reduced if only one out of, say, 20 drivers had to pay. This can happen if each driver makes a bet with the toll authority such that:

The toll authority can win $20 from each driver, The toll authority's chance of winning is 1/20.

(The toll authority pays for the chance to win by forgoing the $1 payment.)

The toll authority's EV is $1 and each driver's expected payment is $1. Both parties save time since only one out of every twenty drivers must stop.

(This example is simplified of course because a different type of toll plaza must be constructed so that each driver can actually make a bet and can stop if he or she loses. Such a toll plaza can still make traffic go much faster.)

Dividend Check

Let us assume that General Motors is paying a stockholder a $0.25 dividend and paying this amount by check.

Let us further assume that the cost of writing the check is $0.60.

G.M.'s PUC (assuming $0.25 is one unit) is $0.60. G.M.'s total cost of paying a $0.25 dividend is thus $0.85.

Now, if G.M. was paying a $25,000 dividend with a check, the cost of writing the check would still be $0.60 (we are assuming). Taking our unit to be $0.25, there are 100,000 units in the $25,000 dividend. Hence the PUC is $0.60/100,000.

Now, G.M. can make a bet with the dividend Receiver such that:

The dividend Receiver forgoes the $0.25 dividend,

The dividend Receiver then gets the chance to win $25,000 and The dividend Receiver's chance of winning is 1/100,000.

The dividend Receiver's EV is $0.25 and G.M.'s expected payment is $0.25. But the point is that G.M.'s Expected total cost of paying the $0.25 dividend is 1/100,000×($25,000+$0.60 (the amount it takes to write the $25,000 check))=$0.250006, instead of the original $0.85.

Rounding Purchase Prices--Eliminating Coins

Consider a typical cash purchase at a store, a candy bar being bought for $0.40. In this case, the commodity being considered is money which is being paid in the form of coins. There is a time cost associated with handling coins for both Receiver and Payer of the coins. It would be preferable for both Payer and Receiver if the purchase was made with a bill, say a $1 bill. A bet can be set-up such that:

The store can win a $1 bill from the customer The store's chance of winning is 40/100.

The store's EV is $0.40. The customer's Expected Payment is $0.40.

A purchase is paid for with $1 or $0. Therefore, both parties save the time cost of dealing with coins.

Hybrid Payments

Hybrid payments are those where part of the payment is made in the conventional way and part is made in the EV way. In a hybrid payment:

The Receiver definitely receives an amount, X, of a commodity.

The Receiver also pays for the chance to win an amount, Y.

X+Y=the BA. The OA is somewhere between X and Y.

If the Receiver wins the bet, he gets the BA (the winnings, Y, are added to X). If the Receiver loses, he gets X.

The Expected PUC of hybrid payments, can be lower (but necessarily) than the PUC of payments of the OA.

Hybrid payments can get tricky as the example below demonstrates.

Hybrid Purchase of Eggs

Say a person can buy 16 eggs for $1.60 cents, 10 cents each.

Say further that the price of 24 eggs is $1.92, 8 cents each.

And the price for 12 eggs is $1.32, 11 cents an egg.

And say the person has $1.60 to spend.

The person decides to defintely buy 12 eggs and bet his remaining money to try to win 12 more eggs. If he wins, he gets 24 eggs at $1.60. If he loses, he gets 12 eggs at $1.60. To make the bet, he must put up $1.32 to definitely buy the 12 eggs. He has 28 cents left over to bet.

A bet can be set such that:

He puts up the 28 cents He can win 12 eggs and His chances of winning are 28/60.

His EV then is, 28/5 eggs or 5.6 eggs. His total EV is 12+5.6 (17.6) eggs at a cost of $1.60, a little over 9 cents an egg.

The store cannot complain because its expected revenue for the 12 eggs is 60 cents. The 60 cents is added to the $1.32 equalling $1.92, the amount of money the store charges for 24 eggs.

Transferring Expected Savings

When an EVPM is used, as it is described in the examples above, one or both parties in a bet have an Expected PUC lower than the PUC of the OA. Hence, one or both parties has an Expected Savings.

It is possible for a party, call it the first party, to transfer all or part of its savings to the other party, up to the point that the first party's Expected PUC is no worse than its PUC at the OA.

(The principle is the same with hybrid payments. One party can give the other its savings up to the point that the party doing the giving does not have a worse Expected PUC than its PUC at the OA.)

The bet between the parties can be set so that any percentage of one party's savings are transferred to the other party. The bet can be so set by varying the three values that make up a bet: The Receiver's Chance of Winning, What the Receiver Can Win and, The Receiver's Cost For Having the Chance of Winning.

The examples below illustrate.

Purchasing Pens Revisited

In the example used above where pens are hypothetically purchased by a store from a distributor, the store's original purchase is 50 pens for $100, a PUC of $2. By making a bet in which the store can win 500 pens with 1/5 chance of winning the pens and at a cost of $100, the store gets an EV of 100 pens for $100, $1 per pen. This represents a savings of 50 pens. The store can transfer this savings to the distributor by changing the odds on the bet such that:

The store pays $100, The store can win 500 pens and The store's chance of winning is 1/10 (instead of 1/5).

The store's EV is then 50 pens for which the store has paid $100 making the Expected PUC $2 per pen. The store has lost nothing relative to the original purchase while the distributor has an Expected Payment of 50 less pens.

Dividend Revisited

In the example of the dividend check, G.M.'s original payment was $.25 plus the cost of making that payment, $.60. By making a bet with the stockholder, G.M. was able to have an Expected payment of $.250006 cents, hence G.M. had an expected savings of $.599994. This can be transferred if a bet is set up such that:

The stockholder pays for the chance of winning by forgoing the $.25 dividend The stockholder can win $25,000 The stockholder's chance of winning is 85/25,000.60.

G.M.'s expected total payment will then be $.85. Hence, G.M. loses nothing relative to the original payment.

An equivalent bet can be set up such that:

The stockholder pays for the chance of winning by forgoing the $.25 dividend The stockholder can win $84,999.40 (instead of $25,000) The stockholder's chance of winning is 1/100,000.

The stockholders EV is $.84,9994 cents. G.M.'s expected total payment is: $84,999.40+$.60 (the cost of writing the check) x 1/100,000=$.85. (This assumes that the cost of writing a $84,999.40 check is $.60 cents.)

(This second bet demonstrates that bets can be set up such that the Receiver wins more than the BA. But that really is a matter of point of view. From the Payer's point of view, the same BA has been paid. The extra amount that the Receiver can win is just the Payer's costs incurred in paying the BA. The essential point remains: By giving the Receiver the chance of winning an amount at which PUC's are less than those of the original payment, one or both parties gets a lower Expected PUC than at the original payment.)

Rounding Purchases—Eliminating Coins Revisited

In this example, a customer buys a candy bar for 40 cents. Let us just focus on the time costs for the store in receiving payment. Assume that the time costs are quantified by the store at 10 cents for receiving the 40 cents. Let us further say that the store quantifies the time cost of receiving a $1 bill at 5 cents.

The question then is what are the PUC's in each case.

If, out of a 40 cent payment, 10 cents go into time costs, the store can really only say that it has received 30 cents at a cost of 10 cents. If, out of a $1 bill payment, 5 cents go into time costs, the store can only say that it has received 95 cents at a cost of 5 cents. Assume a unit is 1 cent.

The PUC's in the first payment are 10/30 of a cent for each cent received and the PUC in the second are 5/95 of a cent for each cent received The store can then make a bet such that:

The store forgoes the 40 cent payment The store can win a $1 bill The store's chance of winning is 30/95 or equivalently (30+150/95)/100. The customer's expected payment then is 30 and 30/19 cents instead of 40 cents. The store's EV is 30 units plus 150/95 units. The 150/95 units are actually the cost for the store of receiving the 30 units, which is the same PUC as at a payment of $1. Hence the store neither loses or gains anything by betting.

Hybrid Payment Revisited

In the hybrid example, the customer definitely paid for the twelve eggs. This left 28 cents for him to bet. The bet can set such that:

He pays $.28, He can win 12 eggs and His chance of winning is ⅓.

His EV is then 4 eggs. These 4 are added to the 12 he definitely bought. Thus, his total EV is 16 eggs. He paid a total of $1.60, leaving him with the same PUC he had in the original purchase. He loses nothing. The store saves 1.6 eggs on average.

An EVPM Used By Businesses To Increase Revenue By Offering Betting Customers a Better Expected Price For a Commodity Than Is Offered to Conventionally Paying Customers In certain situations, businesses can offer customers who bet to win an amount of a commodity a lower Expected PUC than customers who pay conventionally for that amount. In this case, the EVPM does not lower Expected PUC's by giving Receivers the chance to win an amount greater than a certain amount but instead by giving them the chance to win that certain amount itself.

Bettors can get a better Expected PUC because of the cost structure of certain businesses. Businesses that have low variable costs in particular—such as airlines, hotels, data-bases, T.V. stations and communications networks—can use an EVPM to offer bettors lower Expected PUC's. The businesses in return get greater revenue and therefore greater profits. The key to using an EVPM in this way is the ability of a business to segment customers according to those who are willing to bet and those who are not. If all customers could bet they all would and the business would get less revenue. But, in certain situations, business can profitably segregate customers. The example below illustrates.

Assume an airline charges $200 for a coach seat and $400 for a first class seat.

The airline can give customers who purchase a coach seat the chance to bet to upgrade to a first class seat. The bet could be set up such that:

The customer pays $50

The customer can win a first class upgrade.

The customer's chance of winning is $\frac{1}{2}$.

The customer's expected cost is $100. Hence, given that the customer has paid $200 for the coach seat and expected cost of $100 for the upgrade, the total expected cost of the first class seat is $300.

The key for the airline is to stop passengers who would normally pay $400 for first class seats from buying coach seats and betting until they won a first class seat. The airline thus would have to limit the number of bets a coach passenger could make to upgrade. The airline can profit because the variable cost of a first class seat is quite low.

Is an EVPM Legal in Places Where Gambling is Illegal?

It would seem that an EVPM would be legal in places where gambling is legal. The question inevitably arises, is an EVPM legal in places where gambling is illegal?. In some cases it might be; in others it might not. What constitutes "gambling" is not clearly defined, nor perhaps can it be. Gambling on stocks, for instance, is legal because there is a presumed value in allowing such gambling. In many cases, the EVPM described above has an undoubted value in reducing the per unit costs of paying and/or receiving a given amount of a commodity.

Further Discussion of the Scope of an EVPM

This application discloses that an EVPM is a very general method which can be used in very numerous specific situations to lower expected per unit costs. Other people (unknown to the inventor) may have previously though of one or more of the specific uses of an EVPM that are herein disclosed. But that that does not mean that any such persons have disclosed the general applicability of an EVPM. The question then arises, if someone else has come up with a given, specific use of an EVPM, has this person also thought of any other uses?. I think not. It is hard to say for sure what is an original, new use for an EVPM because we have no good theory of idea origination. Good ideas are usually obvious in retrospect but not at all in prospect. It seems therefore that a person's idea should be restricted to what he or she actually points out and to what he or she obviously implies.

The inventor will try to divide the general use of an EVPM into separate, still somewhat general uses which seem different from each other in that each seems to require a different, new leap of imagination to perceive. For example, the realization that General Motors can agglomerate its various small dividend payments into one big payment that is won by one shareholder is clearly not the same as the realization that purchases at stores can be rounded fairly only by betting. And this realization is clearly not equal to the realization that all purchases can be "converted", by betting, into integer multiples of one denomination. Yet, if one sees the central, unifying idea behind these cases, the realizations can be seen as different manifestations of that one, unifying idea. If one does not see the unifying idea, the manifestations are different ideas. Analogously, electricity and light were once thought to be very different things and are now known to be manifestations of the same fundamental force.

The uses of an EVPM given below are not meant of fully characterize the use of an EVPM. That is done by the earlier discussion. The purpose of the discussion just below is primarily to more fully explain the idea of how an EVPM can be used and to stake out the inventor's priority in claiming the new uses of an RNS.

1) An EVPM can be used to lower expected PUC's by taking advantage of the cost structures of certain businesses. This use of an EVPM is the most different from the other uses because the Receiver of a commodity is not betting to receive a greater amount of the commodity than was originally intended to be received. This use is also very different because businesses segregate customers according to whether they are willing to bet or not.

2) An EVPM can be used to take advantage of the fact that sellers can offer lower per unit prices on certain commodities as certain greater amounts of those commodities are sold. The best example of this principle is the difference between wholesale and retail prices.

3) An EVPM can be used to group many small payments into one big payment which is dispensed as in a lottery. An example is having many small dividend payments put into a pool which is won by one shareholder as in a lottery.

4) An EVPM can be used by a Payer to reduce the number of payments needed to be made. For example, a company can have an agreement with certain other companies that any payment under $500 will be bet such that the company pays either $500 or $0.

5) An EVPM can be used by Receivers to reduce the number of payments received. For example, a magazine publisher can include means on its business reply cards for subscribers to bet as to whether they will pay for the subsciption. If they win they pay nothing. If they lose, they agree to pay more. Likewise, in electronic funds transfers, the Receivers and the Payers of the funds can agree that a bet will take place if the amount to be transferred is under a certain amount. Such betting will reduce the overall traffic of electronic transfers. Depending on how this use of an EVPM is phrased, it may seem very similar to the use mentioned in #4, but the implementation is very different, pointing out that is also seems to be a different idea and therefore a different use.

6) An EVPM can be used to round purchase amounts. This use of an EVPM is different from the uses mentioned above and below because the nuisance of "getting change back" is universal in a modern economy and rounding is thus an appealing goal but that goal is not necessarily connected to other goals in peoples minds. The insight that the only fair way to round is by betting may occur to one but that does not means that the insight extends to the uses above and below.

7) An EVPM can be used to speed up the movement of lines of people who have to pay for something. Such lines can move more quickly if fewer people have to pay. This goal can be accomplished with an EVPM. To make an EVPM practical in this situation, a special Expected Value Payment Execution System is needed. This is disclosed after the sections disclosing means for insuring that expected value payment bets are fair.

8) An EVPM can be used to simplify variety, possibly creating system-wide efficiencies. The primary, though not exclusive, example is explained below.

A PROPOSAL FOR OCCAMMING OUR CURRENCY

Occamming is a fake word created from the name of William of Occam, a philosopher who in the early thirteen hundreds said, "It is vain to do with more what can be done with fewer." This idea, called Occam's Razor, is an important criterion for judging scientific theories. Its more familiar form is, "Entities are not to be multiplied beyond necessity."

You may have considered the time people spend counting, carrying, storing and sorting the penny. If so, you probably realize that the penny is more trouble than it's worth and should be eliminated. But have you ever considered the possibility of really occamming our currency by replacing all our bills and coins with one bill or coin? That way people and businesses wouldn't have to spend so much time handling currency, an activity which costs society a great deal in total.

In fact, we can occam to one bill or coin, by adopting an expected value payment method (EVPM).

Say you can win $100 in a poker hand.

If your chances of winning are ½, your EV is $50.

If your chances of winning are ¼, your EV is $25.

If your chances of winning are 49/100, your EV is $49.

By changing the odds we change your EV. This is what we can do with an EVPM. We can hold the amount the store can win constant at a given amount, say, $20. Then we can vary the odds so that the store's EV will equal the price of the item bought, if that item is less than $20. Hence, all purchases can be made in integer multiples of (say) $20.

(In the case where an item is more than $20, the purchase price would be divided by $20 and the remainder would be bet for. Hence, in the case of an $85 item, one would pay four twenties and bet to round up or down the remaining $5.)

If an EVPM is adopted universally in this way, only one denomination is needed. One result is that stores no longer make change. Thus it is much easier for them to safeguard their money because their receipts can immediately go into drop safes. Further, stores no longer need a float so, the nation's currency requirements are reduced and the currency saved* can go to productive investment. An added bonus is that robocashiers become more feasible.

*In the U.S. alone, about $250 billion is in circulation. How much of that is needed for making change is unknown.

Obviously, it is possible to occam currency less and have more than one coin or bill. If a currency has two denominations, one big and one small, people who fear losing can bet small all the time and not risk serious loss over the long run.

Invention Disclosed

Herein disclosed is a new use for an Random Number Supplier (RNS), namely an RNS used to decide the outcome of bets in an EVPM used for the purposes described in the preceding part of the application.

Also disclosed are Expected Value Payment Execution Systems (EVPES's) that make an EVPM practical in the marketplace.

At the minimum, an EVPES requires an RNS.

The RNS can be variable to handle the odds on any bet.

An EVPES can also include means for registering, recording, calculating and displaying (or otherwise communicating) one or more of the values below for one or both parties involved in an EV payment.

The Original Amount of the Commodity To Be Paid and Received

The Total Original Cost of Receiving the Commodity

The Total Original Cost of Paying the Commodity

The Original PUC of Paying the Commodity

The Original PUC of Receiving the Commodity

The Amount Definitely To Be Paid and Received

The Amount That Can Be Lost By the Payer

The Amount That Can Be Won By the Receiver

The Chances of the Receiver Winning

The Expected Amount of Commodity To Be Paid and Received

The Cost of Receiving the Definite Amount of the Commodity

The Cost of Paying the Definite Amount of the Commodity

The Cost of Paying the Expected Amount of the Commodity

The Expected Increase In the Amount To Be Received Over the Original Amount

The Expected Cost Savings Over the Cost of the Original Amount

The Expected PUC of Receiving the Commodity

The Expected PUC of Paying the Commodity

The Range of Numbers That Will Win For the Receiver

The Random Number that Decides the Bet

Who Has Won the Bet

The Total Actual Amount of the Commodity Paid and Received

The Total Actual Cost of Paying the Commodity

The Total Actual Cost of Receiving the Commodity

In ordinary payments, there are usually payment execution systems in place that include one or more of the following functions: accepting, registering, calculating, recording and displaying the payment. Examples are cash registers, ATM machines, vending machines, debit card machines, tollbooths, electronic stock exchanges, check clearing operations, and telephone sales operations.

An EVPES can be incorporated into these conventional payment execution systems. Payments can then be made by the expected value method, conventional method or, a combination of the two (where part of the payment is conventional and part is expected value). To illustrate, FIG. 1 shows a cash register which allows part of a cash payment to be made in the conventional way and part to be bet (for the purpose of rounding a payment to a more convenient amount).

Means Necessary in EVPES's To Prevent Cheating

If the parties involved in an EV payment bet do not trust each other, then they must be sure that cheating does not occur, that the bet is fair. Therefore, also disclosed are EVPES's with means for preventing cheating in EV payment bets. The means required to prevent cheating are surprisingly subtle, just as methods of cheating often are.

Let us then look at the basic possibilities for cheating and the basic approaches for preventing cheating.

If a party is an individual, he or she can cheat the other party. Hence, each party needs to defend itself against cheating by the other party.

If a party is an organization, its employees can be in cahoots with the other party in the bet. Hence, an organization may have to prevent its employees from cheating the organization itself.

If an organization trusts its employees, the organization can be considered as an individual for the purposes of preventing cheating because the organization does not have to try to prevent employee cheating, just as an individual does not have to prevent his or her own cheating.

PEOPLE CAN CHEAT IN THREE BASIC WAYS, EACH OF WHICH MUST BE PROTECTED AGAINST.

I) A person can cheat by setting the BET* after the RN is revealed.

*It is important to note that a BET may also include information on who has made the BET. For example, putting a $10 chip on the red in roulette is a certain bet. But, this bet can be further distinguished, and often must be. The bet, for instance, can be distinguished as John Doe's $10 bet on red. Of course it can be even further specified, e.g. John Doe's $10 bet on red at table #19 at 10:01 p.m. It is necessary to uniquely specify a BET for the purpose of preventing cheating. What is required to uniquely specify a bet depends on the situation.

In a game of roulette, this cheat corresponds to a person placing his chips on the table after the ball has landed in a slot on the wheel.

To prevent this cheat, an EVPES requires means for insuring that the BET is set before the RN is revealed.

II) A person can cheat by trying for a favorable RN after an unfavorable RN has been revealed.

This cheat corresponds to re-spinning a roulette wheel after it has given an unfavorable result.

To prevent this cheat, an EVPES requires means for insuring that once the RN is revealed, it cannot be changed in a given bet.

III) A person can cheat by having an unfair RN generated in the first place.

This cheat corresponds to a rigged roulette wheel.

To prevent this cheat, an EVPES requires means for insuring that the RN is fair in the first place.

The RN can come from three sources.

1) The RN can come from a RNS that is potentially controllable by one of the parties involved in a bet.

2) The RN can come from combining inputs of both parties, each input determined by one of the parties.

3) The RN can come from an RN generator that is not controllable by either party but by an independent, neutral party.

Corresponding to these three sources are three approaches for insuring that a fair RN is supplied:
Inspecting the RN Supplier
The Generation of RN's by Combining Inputs From Both Parties in a Payment
The Use of Verifiably Independently Determined RN's.

These approaches are general. Specific means are required in each approach to prevent cheating depending on the payment situation. (In particular, it may matter if the RNS is visible to both parties.) The specific means will be discussed in the following sections which cover these approaches.

Inspecting the Random Number Supplier (RNS)

Assume that one party can potentially control or tamper with the RNS so that the RNS supplies unfair numbers. And assume that no other party can exercise any control over the RN's. In this situation, an INSPECTION of the EVPES—at least the RNS part—is in order.

For convenience, we will call the two parties in a payment, Ed and Art, if they are individuals, and Ed & Co. and Art & Co., if they are organizations. And we will assume that Ed is the party that can potentially control the RNS.

Ed may or may not control the full EVPES. Since the EVPES is a system, part can be controlled by Art.

Why an Inspection Is Necessary

Even if the RNS is visible to Art and is made by a trusted manufacturer so that Art can be sure that the RNS is designed to dispense fair RN's, very skilled criminals can tamper with or counterfeit it. Naturally, the manufacturer can employ means for making tampering and counterfeiting difficult. Many such mechanical means are well known in the art. They include sealing a RNS in such a way that any tampering is obvious, making the RNS with circuitry that becomes disabled when tampered with and, making the RNS with materials that are not easily duplicated. Yet, such means probably cannot stop all tampering and certainly cannot stop all counterfeiting. Hence, an inspection or the threat of one is necessary to insure that Ed has not rigged the RNS.

THE VARIOUS SITUATIONS IN WHICH CHEATING MUST BE PREVENTED

There are 4 payment situations in which cheating can occur.
1) A payment between Ed and Art.
2) A payment between an Ed & Co. and Art.
3) A payment between Ed and Art & Co.
4) A payment between Ed & Co. and Art & Co.

If an EVPES has means for preventing cheating in situations #2 and #3, it automatically has means for preventing cheating in situation #4.

Ed's EVPES may be visible to Art; for example if the RNS is in a cash register in a store. Or, the EVPES may not be visible to Art; for example if the EV bet is processed by a telephone salesperson. Cheating may differ depending on whether the EVPES is visible of not. Five different EVPES's are needed to prevent cheating in all the generic payment situations. These five are described below.

Payment Between Ed and Art

1. Ed's EVPES Visible to Art

Ed is concerned about Art claiming that the BET was different after the RN is revealed.

To avoid confusion and deliberate cheating, the EVPES should have, but does not require, means for verifying that Art has agreed on the BET before the RN is revealed. For example, the EVPES can have a "lock-in" button which Art presses, before the RN is revealed, proving when Art has agreed to the BET.

Art is concerned about Ed's RNS being unfair.

Means are required to assure Art that the RNS is dispensing fair RN's. The means discussed here is an inspection.

Part of a proper inspection includes means for assuring Art that the RNS has been properly inspected.

To assure Art that the RNS has been properly inspected, an inspector must place, on the RNS, an inspection sticker, or the equivalent information carrier, that will be in plain view of Art. The sticker must have the telephone number of the relevant inspection company. Art can then call the inspection company and verify that an inspection of the RNS has indeed taken place. (FIG. 1, 11 shows such a sticker.) Otherwise, inspections can be faked with counterfeit stickers.

Art may also be concerned about Ed trying to change the BET after an RN unfavorable to Ed is revealed.

The EVPES should have, but does not require, means for demonstrating that Ed has agreed on the BET before the RN is revealed. The lock-in button mentioned above is an example of such means.

Embodiments illustrating the means discussed above, will be provided after the discussion of means for preventing cheating in payments between Ed & Co. and Art, in which Ed's EVPES is visible to Art (#3 below).

2. Ed's EVPES Not Visible to Art

Art is concerned about Ed's RN's being fair.

Hence, means are required to insure that the RN's are fair. Again, the means being considered in this case is an inspection.

One type of inspection is to have the RN generation witnessed by a neutral party.

Usually it is not feasible to have a witness though. The method then for insuring proper inspections differs from the method used if the Ed's EVPES is visible.

First, the information that is on the inspection sticker, mentioned above, must still be communicated to Art and it must be communicated before the RN is revealed. Obviously, no sticker is in front of Art, therefore Ed must—before the RN is supplied—inform Art of the RNS ID number, the inspection company and the inspection company's telephone number. Otherwise, Ed can use multiple RNS's, choose the best RN from among them and, then give Art the RNS ID number.

Second, Art (or some other parties involved in expected value payments with Ed) must contact the inspection company and give it all the details of his transactions with Ed. That way, the inspection company can verify that bets are being executed fairly, as Ed claims. Otherwise, Ed can claim that a fair RNS is being used while in fact no RNS at all or an unfair one is being used. Of course, so that the inspection company can verify the information given by Art, the RNS must be able to fully record all transactions, including the customer's name, the BET, the RN and the time (or purchase number, in order to uniqueley specify the BET).

Ed is concerned about Art trying to change the BET after an RN unfavorable to Art is revealed.

Hence, an EVPES should include means for demonstrating that Art has agreed to the BET. One example is recording the conversation between Ed and Art, if a payment is made over the phone.

Art is also concerned about Ed trying to change the BET after an RN unfavorable to Ed is revealed.

Hence, an EVPES should include means for demonstrating that Ed has agreed to the BET before the RN is revealed. (To repeat, the BET includes what can be won and what numbers will make the receiver win but it also includes information to uniquely identify it as a given customer's bet, such as the customer's name.)

Art may also be concerned about Ed secretly generating another RN if the first one generated makes Ed lose.

Hence, an EVPES requires means for insuring that Ed can only generate one RN per bet.

Embodiments illustrating these means will be provided after the discussion of means for preventing cheating in payments between Ed & Co. and Art, in which Ed & Co.'s EVPES is not visible to Art (#4 below).

Payment Between Ed & Co. and Art

3. Ed & Co.'s EVPES Visible To Art

This situation is the same as a payment between Ed and Art in which Ed's EVPES is visible to Art, except that, Ed is concerned about cheating by his own employees in cahoots with Art.

Ed therefore must prevent his employees from changing the BET after the RN is revealed and prevent them from changing the RN.

Hence, the EVPES requires means for insuring and recording that the BET is set before the RN is revealed and means for insuring and recording that only one RN is revealed per bet.

EMBODIMENTS

Embodiments follow that can be used in payments between Ed and Art in which Ed's EVPES is visible to Art and in payments between Ed & Co. and Art, in which Ed & Co.'s EVPES is visible to Art.

Described below is an EVPES incorporated into a conventional cash register that, if inspected properly, can insure fair bets:

0) The register has an EVPES incorporated into it for the purpose of automatically setting up bets, resulting in all purchases being rounded to the dollar.

1) A store register totals up the Purchase Amount and displays it.

2) The register also displays the BET. (The BET in this case equals the part of the Purchase Amount that is not even to the dollar. Hence if the Purchase Amount is $5.31, the BET is for $0.31. The BET is decided by an RN from 1-100. The customer wins if the RN is anywhere from 1-the amount of the bet. Hence in the case of the bet for $0.31, any RN from 1-31 is a winner for the customer.)

3) The clerk then says to the customer, for instance, "Is that all? Are you sure? Please press the 'Lock-in' button." The register has a button on the back for customers to press. The pressing of the button serves two functions. It is the customer's official acknowledgement of the Purchase Amount and therefore the BET. And it is a mandatory step that has to be taken before the register activates the RNS. In fact, the lock-in button does activate the RNS. (Hence, the BET cannot be changed after the RN is revealed.)

(The RNS is constructed so that it can only supply one RN per BET.)

The RN is then displayed and the register indicates who has won the bet.

The transaction is recorded on the store's register tape, thereby making it unfeasible for the clerk to try to change the transaction in any way.

On the register is an inspection sticker with the following information: the name and telephone number of the inspection company, the date of the last inspection and the ID number of the register.

Rather than retrofit cash registers, it may be easier to use a free standing, electronic RNS. One such device is shown in FIG. 1.

It has a keypad 1 with which the store clerk can enter the Purchase Amount. This keypad is connected 2 to the RNS which the customer operates. The BET is displayed 3 on the RNS. The RNS has usage instructions 4. The customer presses the appropriate button 5 when he or she decides which denomination to round to. The customer then pays the clerk the Purchase Amount rounded up to the given denomination. The customer then presses the button to generate an RN 6. The RN is displayed 7 and "WON" or "LOST" is displayed 8. The RN is an integer from 1-100, 1-500, 1-1000 or, 1-2000 depending on the denomination the customer chooses. If the customer wins, the clerk gives him or her back one unit of the denomination being rounded to. To allow management to check whether clerk has transferred the correct information to the register, the RNS prints a paper tape 9 of transactions. Management can check this tape against the register tape. The RNS is plugged into a socket with an electrical cord 10. The RNS has an inspection sticker 11 with the inspection company's telephone number.

In certain situations, for example in some restaurants, it might be convenient to separate the RNS from the part of the EVPES that tabulates and displays prices and prints receipts. In such a situation, a possible means for demonstrating that the BET is set before the RN is revealed is to have a register record the time the BET is set and have the RNS record the time the RN is revealed, both records, of course, being available to management. The BET and the RN would have to have matching sequence numbers as well so only one RN could be used for each BET. In this case, to demonstrate that the customer has agreed on the BET before the RN is revealed, the customer can be asked to review the bill before the RN is revealed. If the customer acknowledges the bill, he or she can sign it, like a credit card slip.

4. Ed & Co.'s EVPES Not Visible To Art

This situation is the same as a payment between Ed and Art where Ed's EVPES is not visible, except that Ed needs to prevent cheating by his employees.

Hence, in addition to the means mentioned in situation #2, Ed & Co.'s EVPES requires means for insuring and recording that the BET is set before the RN is revealed and means for insuring and recording that only one RN is revealed per bet.

Embodiments follow that can be used in payments between ED & Art in which Ed's EVPES is not visible to Art and in payments between Ed & Co. and Art, in which Ed's EVPES is not visible to Art.

One way to prevent cheating that includes all the necessary means is to: Publicly set the BET at a time before the RN is to be revealed and To announce when and how the RN will be generated and To allow the RN Generation to be witnessed.

An example is described below.

Assume that General Motors has decided that all dividend payments under $1 are going into a single pot which only one dividend recipient will win. (Each stockholder's expected value can be set to equal his or her normal dividend payment.)

Before pulling the winning number, GM can announce the rules of the lottery. First, it can set a time that the winning number will be picked. Second, it can say in advance what RN's will win for each stockholder. These numbers can correspond to the serial numbers on each stockholder's share(s). Third, GM can allow a neutral inspection company to examine the RNS and to witness the actual RN generation.

In this case, the shareholder's acknowledgment of the BET is automatic because the BET depends on the normal dividend payment, the size of the lottery pool and the serial number of his or her stock certificate(s).

An example of an EVPES that protects against cheating, if inspected properly, is given below:

A client calls his stockbroker to buy 40 shares of Blob, Inc. at $1 a share.

The broker says, "If you buy 100 shares, they will only cost 95 cents each."

The client says, "I've only got $40 to spend."

The broker then says, "You can bet the $40 to win the 100 shares. Your expected cost per share will be 95 cents if the stock doesn't move any from where it is now and your expected number of shares will be slightly over 42."

The client says okay.

The broker then says, "Please take all this information down. You may verify it by calling the company that inspects our Random Number Generator. We're going to use an IBM model FFFFF Random Number Generator, unit no. 433332. It's inspected by ACE Inspections and it was last inspected on July 2, 1990. Ace can be contacted at 202-999-3333. Your purchase number for this bet is 1111112."

"Are you sure you want to bet the $40 to try to win the 100 shares of Blob? If you are, please say so now. I'm going to press a button that activates a recorder to tape the next ten seconds of our conversation. I am doing this to make a record of our mutual acknowledgement of the bet."

The EVPES in this example must be the kind where the BET (including client name) must be set before the RN can be revealed, where only one RN can be revealed per BET and, where all the information on the transaction is recorded so that an inspection company can review it.

Payment Between Ed and Art & Co.

5. Ed's EVPES Visible to Art & Co.

This situation is that same as a payment between Ed and Art in which Ed's EVPES is visible to Art, except that in this case, Art is concerned that his employees may be in cahoots with Ed.

Hence, an EVPES needs means, in addition to those mentioned in situation #1, to prevent Art's employees from cheating.

Art's employees can cheat in two ways. First, they can change the BET after the RN has been revealed. This cheat is prevented because Ed's RNS will only generate an RN after the BET is set. Therefore, if Ed tries to change the BET, the inspection company can find him out.

Second, the employees can allow Ed to re-execute the expected value payment until the RN comes out favorably for Ed.

Hence, in addition to the means described in situation #1 above, an EVPES requires:

means for insuring that Art's employees cannot allow Ed to re-do an expected value payment bet.

Embodiments follow.

One way Art can stop his employees from cheating is the following: First, he must know the ID number of Ed's EVPES in advance. Second, he must require that his employees fully record all transactions. This record is given to an inspection company. The inspection company can then compare Art's transaction record with Ed's. If the company finds a discrepancy in Ed's records then Ed will be revealed.

To make this inspection possible, Ed's EVPES requires means that are the same as in situation #2, a payment between Ed and Art, where Ed's EVPES is NOT visible to Art.

Below is an embodiment of means for preventing Art's employees from cheating that does not require the inspection just described.

The EVPES allows an ID number to be assigned to a bet (the ID number can include a name). The ID number can be input into the EVPES before the RN for the bet is revealed. The EVPES supplies only one RN per BET number.

If Ed has this type of EVPES, Art can give his employees a particular ID number to be input into Ed's EVPES for a given BET. Art must also known in advance the EVPES ID number. The RN then supplied is unique to the BET and can't be changed.

The EVPES gives a receipt which includes the BET, the Bet ID number, the RN, the telephone number of the inspection company and the RNS ID number. The receipt provides evidence of the result of the bet. The drawback is that receipts can be counterfeited, giving Art the impression that his employees lost a bet when in fact they had won.

6. Ed's EVPES Not Visible to Art & Co.

This situation is equivalent to #5 because in #5 the EVPES is visible to Art's employee but it is not visible to Art.

The Generation of RN's by Combining Inputs From Both Parties in a Payment

A fair random number can be generated by combining inputs from the two parties in a payment*. A direct analogy in a card game is having one player shuffle the cards and the other cut the cards. The essential requirement to prevent cheating in the combined inputs method is the following:

*It is possible to generate RN's by combining inputs from both parties and from an independent party but such extra combining is superfluous.

Neither party's input generator must be able to take into account** the other party's input when generating an input.

**"Take into account" includes having unfair, probabalisti knowledge of what an input might be.

Hence, an EVPES requires means for insuring that each party's input generator is not able to take into account the other party's input when generating an input.

There are three ways to insure that the party's inputs cannot influence each other.

1) The inputs can be revealed simultaneously. This way is rearely feasible to use in an EVPES.

2) One or both of the generators can be physically unable to make use of the others input.

For example, if one input generator is a person and the other is a spinning wheel, the person can potentially take the wheel's input into account but the spinning wheel can't take the person's input into account.

3) At least one party must provide proof that its input is decided upon without actually revealing that input and this proof must be provided to the other party BEFORE the other party reveals its own input.

In addition to preventing unfair RN's from being used, an EVPES must still prevent the other two basic cheats: changing the RN and changing the BET after the RN has been revealed. In the case of combined inputs, changing the RN is equivalent to taking into account the other party's input. Hence if both parties are prevented from taking into account the others input when generating their own inputs, then changing the RN is also prevented.

Still, an EVPES requires means for preventing either party from trying to change the BET after the RN is revealed (which, in the case of combined inputs, means preventing either party from trying to change the BET after the other party has revealed its input).

In this RN generation method, the RNS is actually a COMBINER of inputs. Let us then in this section refer to it as the COMBINER.

If the COMBINER is controlled by one of the parties, it can supply one of the inputs in addition to combining the inputs.

Now let us look at the various possible payment situations.

Let us also again call our two parties Ed and Art if they are individuals and Ed & Co. and Art & Co. if they are organizations.

Let us also assume that Ed controls the COMBINER.

Three generic situations cover all the situations in which cheating needs to be prevented, if the method of generating RN's is combined inputs. EVPES's which include means for preventing cheating in these three situations will be described. In the first situation, the COMBINER is controlled by Ed and is visible to Art. Art therefore must be sure Ed's COMBINER is fair. In second, the COMBINER is not visible to Art. It turns out that, if the COMBINER is not visible to one party, then the COMBINER is not in control of either party. In this situation, both parties must be sure that the combining is fair. In the third situation, whether the COMBINER is visible or not, one party or both must be sure that its (their) employees cannot cheat.

Payment Between Ed and Art

Ed's COMBINER Visible to Art

If Ed's COMBINER if visible to Art, Ed can provide visual evidence that his own input generation cannot be affected by Art's input. Below are examples. The first uses the principle of making Ed's input generator physically unable to receive any information on Art's input. The others use the principle of providing proof that Ed's input is decided upon BEFORE Art's input is revealed.

The embodiments include means for insuring that neither Ed nor Art can try to change the BET after the RN is revealed.

An EVPES Incorporated Into a Store Register Enabling Customers to Further Randomize a Store's Random Input By Means of a Free Standing Input Device (Infinitely many operations can be done on a store's input to allow the customer to randomize it. In the next two illustrations, addition is the operation used.)

A store has an electronic COMBINER, including a Random Number Generator (RNG), incorporated into its cash register.

The register totals a customer's purchases and then indicates the amount to be bet.

Next to the register, but not electronically connected to it, is a device with which the customer enters a number from 1-2000 (if every purchase is rounded to an integer multiple of $20.00).

This device is electronically separate from the RNG so that the customer's number cannot be communicated to the RNG, thereby preventing the store from cheating.

The separation must be visible to the customer so as to demonstrate to him or her that the customer input device cannot communicate with the RNG.*

*A store can still cheat by having the customer input device and the RNG communicate by radio waves or the like. Such communication can be detected with the proper equipment and thus is probably not a risk a store will take. To fully insure that the input device cannot communicate with the RNG, the input device can be non-electronic, for example, simply paper and pencil. After the customer has written a number on a piece of paper, the paper is time stamped with a mechanical stamper which also records a sequence number on the paper so that the customer number can only be added to one RN. Clearly, guaranteeing no cheating can take place gets complicated.

The customer input device has a display showing the number entered.

The device also has a button that locks in the number.

The device also records the number and the time the number was locked in. This record can be in recallable internal memory or on paper tape.

Once the customer has locked in a number, the store clerk presses a button on the cash register and the cash register's RNG generates a number from 1-2000.

The register records the time this number is revealed.

The reason for recording all these times is to demonstrate that the customer number is set before the store number is generated, thereby preventing customer cheating.

The register itself insures that the BET is set before the store number is generated by allowing a store number to be generated only once per purchase and only after the BET is set on the register.

The clerk then looks at the displayed customer number and enters it into the register which then adds it to the store number. The resulting sum determines who wins the bet (If the sum is over 2,000, then 2,000 is subtracted from it.) The sum is random to the satisfaction of both parties.

An Electronic, Single Device EVPES Allowing Customers to Further Randomize a Store's Random Input The drawback of the previous type of EVPES is that with two separate input devices, separate time recorders are needed, radio communication may need to be checked and most important, seconds are wasted on each transaction as a clerk transfers the customer's input to the register. It is faster to combine inputs electronically. But the two input devices are necessarily electronically separate.

A solution is to generate the EVPES's input onto a non-electronic medium before the customer's input is set. This medium is put in plain view of the customer but the RNG's input, on the medium, is hidden. Then, after the customer input and BET are set, the EVPES's input is revealed. Embodiments below illustrate this solution.

Before a purchase, a store's electronic register, which has an RNG, generates a number and prints it onto a ticket.

To prevent cheating, it is not possible for the customer or clerk to see this printing process.

This number is also stored in memory to be used for the upcoming purchase.

The ticket is spit into a plexiglass covered chute so that only the back of the ticket is showing; the number is printed on the front. The chute has a catch preventing the ticket from falling into a receptacle where the customer can take it. Hence, the customer and clerk cannot see the printed number but can see that it has been set.

During the purchase, the customer enters, with a keypad on the back of the register, a number to add to the store's already printed number.

The customer's number is also stored in memory to be added later to the store's number.

The customer then hits a lock-in button on the keypad when his or her number and the BET are set.

The register will not reveal the store's number until the BET and the customer's number have been locked-in (to prevent customer cheating).

Once the lock-in is pressed, the store's number is displayed on the register. The register adds the customer's number and displays who has won.

The register also releases the ticket to slide down the chute where it can be taken by the customer, thereby assuring the customer that the store number was set before the BET and customer number were set.

(In the following embodiment, the currency used in the economy is assumed to be a single denomination, $10. The set of RN's is the integers 0-999.)

An RNG connected to an electronic register has three sets of 10 small boxes.

The boxes all are enclosed in a clear case.

Three sets of ten balls fit into these boxes.

Each set of a balls is numbered from 0-9.

Each set of balls is randomly placed into a set of boxes from holes underneath the boxes by a mechanism like the one used in state lotteries to pick numbers by blowing numbered balls up into a tube.

This mechanism is hidden from view and is underneath the clear case so that customers and clerks can't see the store input.

Once the balls are in the boxes, the boxes are slid backwards to reveal the holes. This action is to demonstrate that the balls can't be manipulated once they are set in their boxes.

The device also has a set of buttons, 0-9, for a customer to indicate the one box in each set he or she wants to select (buttons can be repeated).

The device also has a button for the customer to lock-in the BET, which is showing on the register, and his or her selection, which has just been made.

When the BET and the customer's selection are locked-in, all the boxes are lifted showing that all thirty balls were present so as to prove to the customer that a fair set of numbers is selected from.

The numbers of the three balls the customer selected are then read by weighing (each number has a different weight) and the numbers are recorded. With three balls, any number from 0-999 can potentially be selected. All the balls are then returned to the randomizing mechanism.

The customer can be sure that the selection is not rigged because the customer is doing the selecting.

As for stopping the customer from cheating, the RNG will not lift the boxes until the BET is locked-in. Further, the RN is recorded on a register tape along with the BET so that the RN cannot be changed or used for another BET.

A Single Device, Electronic EVPES Allowing Another Type of Customer Input into the Randomizing Process A register prints its RNG's input onto a ticket, only the back of which is shown, before the customer's input is set, as in a previous illustration. In this case, the RNG's input into the RN is three letters from A-J. The register prints, say "B", "A", "J" (a letter can be repeated). These letters correspond to strings of numbers in the RNG's memory as shown below.

| A | 0, | 1, | 2, | 3, | 4, | 5, | 6, | 7, | 8, | 9 |
|---|---|---|---|---|---|---|---|---|---|---|
| B | 1, | 2, | 3, | 4, | 5, | 6, | 7, | 8, | 9, | 0 |
| C | 2, | 3, | 4, | 5, | 6, | 7, | 8, | 9, | 0, | 1 |
| D | 3, | 4, | 5, | 6, | 7, | 8, | 9, | 0, | 1, | 2 |
| E | 4, | 5, | 6, | 7, | 8, | 9, | 0, | 1, | 2, | 3 |
| F | 5, | 6, | 7, | 8, | 9, | 0, | 1, | 2, | 3, | 4 |
| G | 6, | 7, | 8, | 9, | 0, | 1, | 2, | 3, | 4, | 5 |
| H | 7, | 8, | 9, | 0, | 1, | 2, | 3, | 4, | 5, | 6 |
| I | 8, | 9, | 0, | 1, | 2, | 3, | 4, | 5, | 6, | 7 |
| J | 9, | 0, | 1, | 2, | 3, | 4, | 5, | 6, | 7, | 8 |
|   | 0  | 1  | 2  | 3  | 4  | 5  | 6  | 7  | 8  | 9 |

To enter an input, a customer presses a set of buttons, 0-9, on the back of the register. These correspond to positions on the lines A-J as shown above. Hence if the RNG's input is "C" and the customer's is "3", the resulting number is "5".

The customer presses three buttons (buttons can be repeated). These yield a final number between 0-999.

The strings of numbers and the letters they correspond to are displayed in a chart, like the one above, so that customers can be sure that the store's input is not changed after being set.

The COMBINER Is Not Visible to Art

If the COMBINER is not visible to Art, Art cannot see proof that Ed's input generator cannot take into account Art's input. Therefore, Ed's must provide some non-visual proof that he has decided upon an input. If Art gets this proof, Art can then reveal his input to Ed. It is just as reasonable though to have Art give Ed some proof that Art has decided upon an input. Ed can then reveal his input to Art.* The point is that Art is in the same position as Ed. When the COMBINER is not visible, the two parties are in a symmetrical position. The COMBINER can't be said to be in either's control; both parties can have equivalent combiners.

*If the COMBINER is visible, it is possible, but not as convenient, to have Art provide proof that his input is commited to and then have Ed reveal his input.

Embodiments illustrating the principle above are given after the section below. The embodiments include means for insuring that neither Ed nor Art can try to change the BET after the RN is revealed.

Payment Between Ed & Co. and Art

In this situation, Ed is concerned about his employees being in cahoots with Art. The situation represents employee cheating whether the employee is Art's or Ed's. Employees can cheat by informing the other party of their own party's input. Hence, it does not matter which party, if any, controls the COMBINER, nor does it matter if the COMBINER is visible or not. The key is to prevent, say, Ed's employees from telling Ed's input to Art before Art has committed to an input.

Hence, to prevent employee cheating, one party—before revealing its input even to its own employees—requires means for insuring and recording that the other party's input is committed to.

EMBODIMENTS

The embodiments that follow include means for preventing cheating in a payment between Ed & Co. and Art, Ed and Art & Co. and, Ed & Co. and Art & Co.

Assume an investor is buying stocks over the phone through his broker. The investor and the broker agree that there will be a bet. Assume further that the brokerage is on one side of the bet. The broker says to the investor, "To arrive at a number that will decide the bet, we're both going to supply a number and add them. The way we'll do this is the following:

I'm going to tell you a BET ID number. This number corresponds to the number we will supply for this bet. The number we will supply is in our computer.

The computer will only release our number after you have supplied your number.

I don't even know what our number is until the computer releases it.

You can be sure that we will not change our number in response to your number because we have pre-registered the BET ID number and the number it corresponds to with a neutral company. After the bet takes place, you can call this company to verify which number the BET ID number corresponds to. The neutral company is called BET WITNESSES, Inc. and can be contacted at 202-999-8888.

Now, our BET ID number is 1314156. If you are sure of the bet, I will patch you into our voice mail system. You must repeat the BET we have agreed to and then tell the number you want to use in the bet.

I will then enter your number into our computer which will release our number. It will then add our number and your number and annouce who has won the bet.

The whole transaction will be recorded and confirmation will be sent to you.

The computer will also release an access code which you can use to contact BET WITNESSES, Inc. If you give them the access code, they will verify the number that the BET ID number corresponds to."

If the investor is part of an organization, the organization can stop him or her from cheating in cahoots with the broker by making the investor enter the following data into a separate Random Number Supplier, controlled by the organization:: the BET, the BET ID number, and the name of the neutral, witness company.

Once this data is set, the organization's RNS supplies a number which is the input to be used in the bet.

The organization's RNS records all this data and the RN it has supplied (it is made to only supply one RN per bet). Hence, the investor cannot allow the broker to change the bet's RN.

A similar method, using codes rather than pre-registered numbers, is as follows.

Assume an investor is buying stocks over the phone through his broker. The investor and the broker agree that there will be a bet. Assume further that the brokerage is on one side of the bet. The broker says to the investor, "To arrive at a number that will decide the bet, we're both going to supply a number and add them. The way we'll do this is the following:

I'm going to tell you our number but the number will be in code. Our computer will release the key to the code after you have supplied your number. You can be sure that we can't change our number because our code is a variant of the public key encryption system in which our number is a prime factor of a very large number. The large number is _ digits long and ends in _. There is a unique prime factor of _ digits that can be multiplied with the code number I've given you that results in the large number I've just described. That unique prime factor is the input we will be using in this bet. Because it is unique, you can be sure that we will not change our number. You will not be able to decipher the number quickly but after you have given us your input, we will obviously give you our number. You can verify it if you like by multiplying our code number by our input number and see that the result equals the large number I've mentioned.

Now, our number in code is _. If you are sure of the bet, I will patch you into our voice mail system. You must repeat the BET we have agreed to and then tell the number you want to use in the bet. I will then enter your number into our computer which will release our number. It will then add our number and your number and announce who has won the bet. The whole transaction will be recorded and confirmation will be sent to you."

If the investor is part of an organization, the organization can stop him or her from cheating in cahoots with the broker by making the investor enter the following data into a separate Random Number Supplier, controlled by the organization: the BET, the broker's encoded input and, the name of the neutral company.

Once this data is set, the organization's RNS supplies a number which is the input to be used in the bet.

The organization's RNS records all this data and the RN it has generated (the RNS is made to supply only one RN per bet). Hence, the investor cannot allow the broker to change the bet's RN.

EVPES's Using Verifiably Independently Determined Random Numbers (IDRN's)

"Independently Generated Random Number" (IGRN) Defined

An Independently Generated Random Number is an RN used in a bet which is generated by an independent, neutral party.

Either party in the payment or the neutral party can dispense an IGRN.

"Inputter" Defined

Regardless of how it is dispensed, if a number is independently generated, one of the parties in the payment must somehow select it to be used. There must be some act—we will call it an input—that causes the number to be supplied (used) in a given bet. Otherwise, the number remains unused. For instance, an input may simply be a request, "Please generate a number for use now."

We will call the party that determines the input the Inputter*.

*Both parties can combine inputs to yield an input for the neutral party. But if the parties combine inputs fairly, they do not need to use an IGRN.

"Independently Determined Random Number" (IDRN) Defined

An IDRN Is a Number That Satisfies the Following Three Conditions:

An independent party must generate the RN.

The RN is supplied in response to an input from one of the parties in a payment and this party, called the Inputter, must not be able to have any knowledge* of which RN the input will result in.

*This knowledge can be probabilistic. For example, in roulette, if a player knows that the ball lands on "9" 1 out of 36 times on average, that player can unfairly play "9" all the time. This knowledge of what number the ball will land on in by no means certain but it still provides an unfair edge because the pay-off is based on #9 coming up 1 out of 38 times on average.

There can only be one input (and hence one RN) per bet.

"Verifiably" Defined

The purpose of an IDRN is to assure that the RN used in a bet is fair. An IDRN cannot do this if there is no evidence that the RN is independently determined. The IDRN must be verifiably an IDRN. A verifiably independently determined random number then is a number that is supplied along with evidence that the number is an IDRN. Hence, an EVPES using IDRN's requires:

means for demonstrating (verifying) that the RN is generated by an independent, neutral party.

means for demonstrating (verifying) that the inputter has no knowledge of which RN the input will result in.

means for demonstrating (verifying) that the inputter can only try one input per bet.

Assuming that an independent party is used to generate RN's, the double requirement for preventing cheating is:

1) the inputter can't have any knowledge of which RN will be supplied and
2) the inputter can try only one input.

There are two basic ways to satisfy this double requirement:

In the first way, the Inputter must commit to an input at a time that is verifiably BEFORE the Inputter can have any knowledge of which RN will result from a given input.

If the time sequence can't be verified, then the inputter may be able—before showing the RN to the other party—try various inputs and select the most favorable one to use in the bet. Or, the Inputter may have found some knowledge of the RN corresponding to a given input. The other party has no way of exposing these cheats, if the time sequence can't be verified.

In the second way, the Inputter must be physically prevented, by some means other than time, from having any knowledge of which RN will result from a given input and physically prevented from trying more than one input.

Note: In addition to insuring that the RN's are fair, an EVPES must insure that neither party can cheat by changing the BET.

Hence, an EVPES requires:

means for insuring that the BET is set before the inputter can have any knowledge of what RN will result from the input and either means for insuring that the Inputter commits to an input at a time that is verifiably BEFORE the Inputter can have any knowledge of which RN will result from a given input.

Or means for demonstrating that the Inputter is physically prevented, by some means other than time, from having any knowledge of which RN will result from a given input and from trying more than one input. Below are embodiments illustrating these means.

(It should be noted that in some sense these last two means are equivalent because when a party is physically prevented from knowing which RN an input will result in, that party automatically commits to an input at a time that is BEFORE he or she can have any knowledge of the RN. And when a person commits to an input BEFORE he or she can have any knowledge of the RN it will result in, then that person automatically is physically prevented from having any knowledge of which RN the input will result in. Nevertheless, it is often convenient to think of these two methods as distinct.

The embodiments below include means for demonstrating that each party has agreed to a BET before the RN is revealed. They do not, however, cover the problem of preventing employee cheating. This subject will be covered after the following embodiments are presented.

EMBODIMENTS

Subscription Payment Where Bet Is Set By Business Reply Card

Assume that Sports Illustrated business reply card solicitations include the following offer to potential subscribers.

"Dear potential subscriber, you can agree to pay $20 for a subscription to Sports Illustrated or you can make a bet with us in the following way:

If we win the bet, you agree to pay $50. Our odds of winning the bet will be 2/5 so that our expected value, and your expected cost, is $20.

What will decide the bet is a number from 1-5. If the number is "1" or "2", we will win the bet.

The number will come from a company called Magazine Subscription Processors, Inc. They are a neutral company with no stake in who wins the bet.

They will generate a number 1-5 for you when they receive this business reply card, indicating that you are willing to enter into a bet with us. If you win, we will not even send you a bill but, if you lose we will send you a bill within 2 weeks of our receiving this card.

If you lose, you can check with Magazine Subscription Processors, Inc. at 1-800-111-1111 to verify that they have indeed generated a number for you AFTER receiving this card and that they have only generated one number for this particular purchase*. That way you can be sure that the random number that decides the bet is in no way rigged.

*The purchase can be identified by your name and address or by the purchase number on this card."

If the subscriber sends in a card like this, he or she has acknowledged the BET. The magazine, of course, has also automatically acknowledged the BET.

Electronic Funds Transfer Bet Decided By Credit Checking Company

Assume that a customer is purchasing a book from a bookstore that has an electronic funds transfer (EFT) machine that gives customers the option to bet so that the customer pays either $100 or $0 (assuming an item costs less than $100). (A customer's expected payment is the price of the item being bought.)

If the customer agrees to bet, the bet is decided in the following way (assuming the EFT works as is described).

The person puts his or her debit card into the store's EFT machine.

If the customer desires to make an expected value payment bet, he or she presses a button on the EFT machine thereby acknowledging the terms of the bet.

The customer's credit is electronically checked with a credit checking company before funds are transferred. The point at which this occurs in the electronic network that processes the EFT is also the point at which the bet is decided. Right after a person's credit is verified, up to an amount that can cover a loss in the bet, an RN is generated by the company that verifies the credit.

The EFT machine in the store is notified that the customer has won or lost the bet.

If the customer has lost the bet, he or she will want to be able to verify that the RN was fair. The receipt therefore includes the telephone number of the credit checking company that has provided the RN.

The customer can call this company, which it is established is neutral in all bets, and verify the number generated and verify that it was the only one generated at that store, for that customer, for that purchase, at the given time.

IGRN's Printed Inside Sealed Paper Packets

IGRN's can be printed inside sealed packets of paper similar to those used by fast food restaurants in prize contests. When torn open, these packets reveal an RN.

A store's register dispenses these and a customer opens them to reveal the RN.

(To prevent employees from being in cahoots with the customer: Before being dispensed, such packets have to be time stamped inside the register to verify that they have been opened after the BET is set. Further, the stamping mechanism cannot be accessible to store clerks.)

A store can find out an RN by tearing open a packet but then that packet cannot be used for a purchase. Since the store could open an advantageous RN just as easily as a disadvantageous one, there is no profit in checking an IGRN inside a sealed packet. Hence, such an RN is an IDRN.

To prevent counterfeiting, the packets have to be printed in some non-duplicatable way. Counterfeiting can be inspected if customers are randomly encouraged to send in packets for testing by an independent company. It seems unlikely that any store facing this constant threat of inspection will use counterfeits.

IDRN's From An Independently Controlled Computer

An independent company can generate RN's on a central computer connected to the RNS on a store's register. When a BET is set, the store's register requests an RN from the central computer.

The RN then sent includes verification numbers as shown: RN__, Register No. __, Time __, Date __.

The register display includes a digital clock which shows the hour, minute and seconds. The RN is based on what this clock is showing at the time of the RNS's request for the RN. The clock is displayed so that the customer can verify almost exactly the time that the RNS request is made.

Almost exactly is not enough however. The store can still potentially influence the selection of the number. For example, the store's register can be rigged to request multiple RN's and reveal only a winning one to the customer. Several RN's can potentially be requested in the space of a second or a few seconds.

To prevent such manipulation, a purchase number is included along with the other numbers. The purchase number is a sequence number in the sense that if a person is making the 51st purchase of the day, the purchase number would be "51".

In addition, the register display, clearly visible to customers, shows the current purchase number so that the store cannot change it during a purchase.

The final step in stopping store manipulation is taken by the central computer. It only supplies one RN per purchase number per day per register. Therefore, upon detecting a losing number, the register cannot request another RN for that purchase number*. Hence, the store cannot influence the selection of the RN.

*If the RN depended only upon a purchase number and not the time as well, the RNS could check the RN that corresponded to a given purchase number and delete the RN if it was disadvantageous. Hence, it is necessary to make the RN vary with the time and the purchase number.

The store's receipt includes the verification company's telephone number so the customer can verify the fairness of the RN.

IDRN's Dispensed by an RNS Not Controlled by Either Party

If the Inputter does not commit to an input at a time that is verifiably BEFORE the Inputter can have any knowledge of the RN, then the Inputter must be physically prevented from having any knowledge of which RN the input will result in. The Inputter can be physically prevented in the following way.

Call the party's in this payment Ed and Art. Assume that Ed is the Inputter.

Ed determines the input while Art tries the input first.

The trick is that the independently controlled RNS informs Art if he indeed is the first to have tried the input for that given BET. Again, the BET must always be specified ahead of time. Hence, when Ed provides an input, it includes specific BET information such as the amount of the BET and the parties in the BET. If Art finds that the input has been tried before, he knows that Ed may have found out the RN in advance and hence the RN is nullified.

(In essence, this is what happens when one party controls the RNS. The party that controls it is the first to reveal the RN while the other party is the Inputter.)

IDRN's Dispensed by an RNS With Internally Stored Algorithms

Using internally stored algorithms, an RNS can generate RN's which vary according to a customer input and purchase number.

A register's RNS can come fully loaded with algorithms that correspond to purchase numbers as shown:
Purchase 1—Algorithm 884
Purchase 2—Algorithm 6
Purchase 3—Algorithm 94 . . .

The algorithms act on the customer input to generate an RN. An algorithm can simply add a number to the customer number; it can be as simple as:

$RN = x + $customer input; if $RN > Y$, $RN = RN - Y$ (where RN can be from 1 through Y; e.g., if RN's that decide a bet can range from 1-2000, Y=2000).

The order of the algorithms is randomly set by the manufacturer who also records the order so that verification of RN's can take place.

The order varies from register to register so customers cannot extrapolate from one register to the next.

After the BET is set on the register, the customer enters an input on a keypad connected to the register.

The customer then presses a lock-in button on the keypad to set the BET and his or her input.

Upon the pressing of the lock-in button, the RNS then supplies an RN based on the purchase number and the customer input. The store cannot exercise control over the selection because it cannot affect the customer input.

The current purchase number is shown on a display on the register at all times so that the customer can see it, thereby preventing the store from changing it unfairly during a purchase (in this case, purchase numbers are not reset daily as in the previous illustration).

The customer's receipt includes a register number along with a purchase number and the customer's input number so that the customer can call the manufacturer of the register to verify that the proper RN has been dispensed.

However, in addition to these numbers, an access code (number) is also included. A single access code is assigned, by the independant company that determines the algorithms, to each purchase number. This code is, of course, not knowable until the RN is revealed since the code is revealed along with the RN.

The customer must have this access code in order to verify the RN. Otherwise, the customer could find out the RN BEFORE the BET was set, thereby cheating.

When this type of RNS is not visible to the Inputter, for example, if a payment is made by computer or over the phone, the party that controls the RNS must—BEFORE the input is provided—tell the Inputter the RNS I.D. number, the RNS manufacturer, and the purchase number. This information is necessary to uniquely specify the BET. (When the RNS is visible, the Inputter can see all this information.)

As long as the BET is also agreed upon, the Inputter can then feel free to supply an input that will then yield an RN.

Furthermore, if the RN's are generated by a central computer (as opposed to a "fully loaded" on-site RNS) by the same method of algorithms tied to purchase numbers, the cheating prevention situation is the same. The party that accesses the computer must inform the Inputter, before the Inputter provides the input, of the RNS ID number, the purchase number and the RNS manufacturer (or verification company).

An access code still must be dispensed along with the RN thus allowing the customer to verify that the RN is fair but preventing the customer from checking on inputs before a bet is executed.

When the RNS is not visible to one of the parties, there still should be means for the two parties to agree upon the BET. These means will be illustrated in the embodiments that follow the discussion on preventing employee cheating when IDRN's are used.

Preventing Employee Cheating When IDRN's Are Used

Let us look at the possibilites for cheating. Let us again assume that the two parties in an EV payment are called Ed and Art. Let us further assume that Ed controls the RNS that dispenses the IDRN's.

Now, if Ed has employees, they can cheat, in cahoots with Art, by telling Art which input will be favorable to Art (which the employees might be able to know without actually trying an input), by allowing Art to change his input, i.e. by re-doing a BET until a favorable input is found and by allowing Art to change the BET.

Now, if Art has employees, they can cheat, in cahoots with Ed, by allowing Ed to change the input and by allowing Ed to change the BET.

In other words, we still have the three basic cheats: An unfair RN can be selected in the first place, the RN can be changed and the BET can be changed.

If neither party controls the dispenser of the RN's, we have two out of the three basic cheats to prevent. In this case, if the employee is the Inputter, he or she can allow the other party to change the bet or change input. If the employee is not the Inputter, he or she can allow the Inputter to change the input and to change the BET. (An unfair RN cannot be selected in the first place because neither party can know in advance (it is presumed) what inputs are favorable which is possible in certain cases if one party controls the RNS that dispenses the IDRN's.

In other words, an EVPES still requires means for insuring that the Inputter can't have any knowledge of which RN will result from an input and that there is only one input (and hence RN) per bet.

Hence, if an employee is not trusted and that employee is in a position to allow or help the other party to cheat, an EVPES requires means for insuring and recording that the input and BET are committed to at a time BEFORE the suspect employee can have any knowledge of which RN will result from the input.

Or means for insuring and recording that there can only be one input per bet and that no knowledge of this input is revealed to the suspect employee until after the BET is set (setting the BET, in this case, must include setting the RNS to be used).

EMBODIMENTS

Committing and Recording Bet Before the IDRN Can Be Known

Assume Art suspects his employees of being in cahoots with other companies. To stop his own employees from cheating, he makes the following policy:

1) All bets are to be decided by a company called, Neutral Number Generators, Inc.. (Art knows that this company keeps its RN generation secure and that it documents the time and date that is generates a given RN and documents who it releases the RN to. Further, the company only generates one RN per bet.)

2) All bets are to be decided by numbers that are generated the day after a bet is set.

3) All bets are to be unerasably recorded on a register which records the time that the bet terms are set. These terms include a bet ID number which is given to Neutral Number Generators, Inc. Hence, the bet and input are committed to at a time that is verifiably BEFORE any person involved in the payment can have any knowledge of which RN the input will result in. And because the bet has been recorded, it cannot be re-done in an attempt to get a better result.

Insuring and Recording That There Can Be Only One Input Per Bet and That No Knowledge of This Input Is Revealed to an Employee Until After the Bet Is Set Assume the following:

Two companies, Ed&Co. and Art&Co., are involved in a BET. Ed's and Art's employees are handling the BET. And, Ed and Art do not trust their employees. The EVPES in this case includes an RNS, controlled by Ed, and a Random Input Generator (RIG), controlled by Art.

Ed's RNS is of the type such that the RN's are determined by verifiable, internally stored algorithms tied to purchase numbers and acting on customer inputs, as explained in the embodiment on page 66. The RNS also dispenses a secret access code with each RN, for purposes of verifying the RN, as explained on page 67 and below as well.

Art's RIG is a normal type random number generator (it does not dispense verifiably independently generated numbers) that cannot be easily tampered with. The RIG can dispense enough different possible numbers so that even if a person knew all the possible numbers that could be generated, he or she could not make use of that knowledge. The RIG is also a recording device that can fully record the BET transaction.

The payment is executed over the phone therefore, Ed's RNS is not visible to Art's employee (the situation is equivalent though to the RNS being visible).

Figure 2:
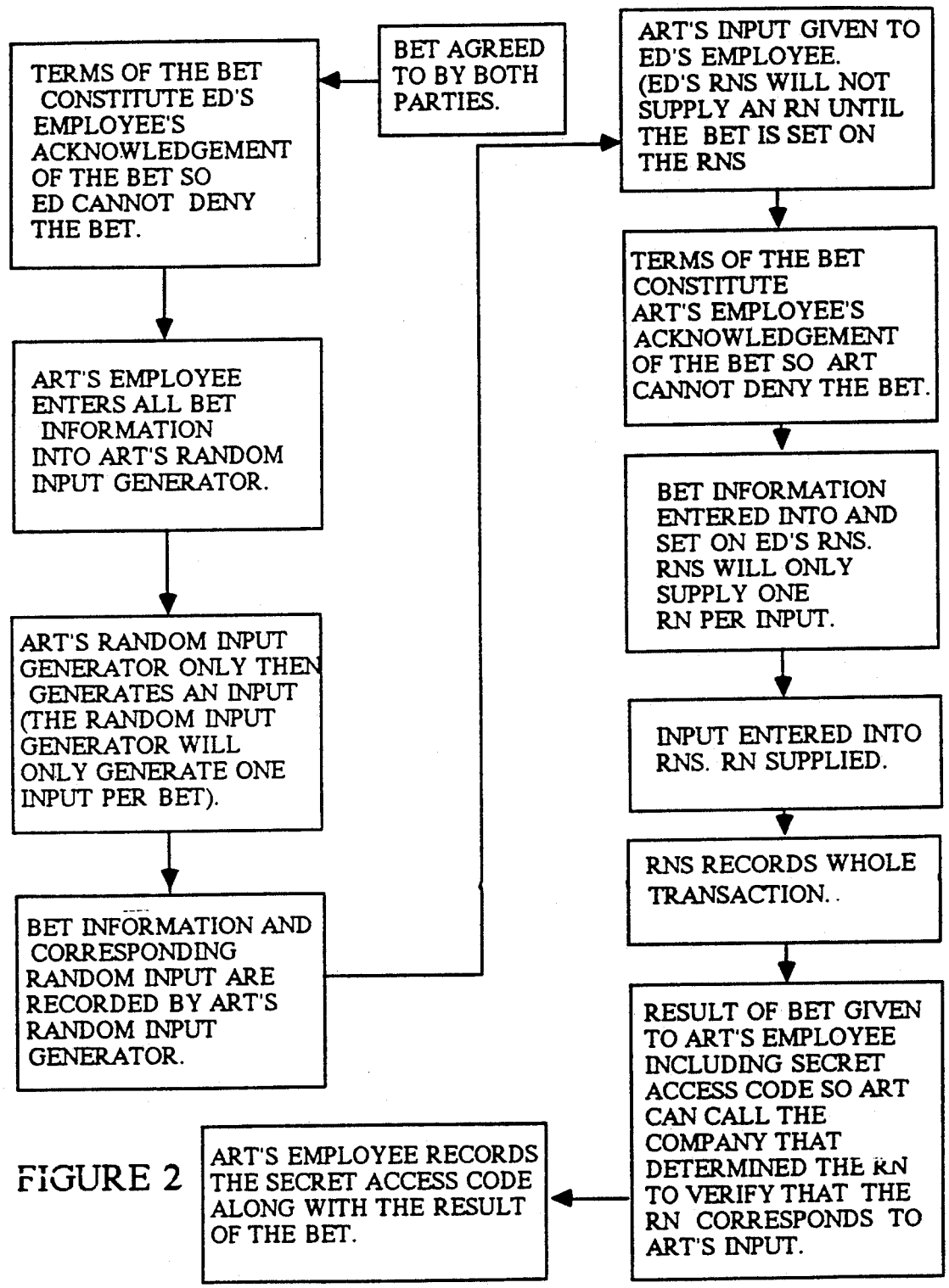
FIG. 2) Schematic explanation of an expected value payment between two organizations using Verifiably Independently Determined Random Numbers.

Given the assumptions above, the payment BET is executed in the way described below (see also the flowchart in FIG. 2):

1) Ed's and Art's employees agree to the terms of a BET which include:
a) What can be won and lost in the BET and by whom,
b) What is paid for the chance of winning,
c) the odds (the numbers that will win for each party),
d) the ID# and manufacturer of the RNS to be used,
e) the ID# and manufacturer of the RIG to be used,
f) the purchase number of the BET.

2) Art's employee requires proof that Ed's employee has agreed to the terms so that if Ed loses the BET, Ed cannot try to claim the BET was different.

If, as we are assuming, Ed's RNS only supplies one RN per input, only supplies an RN after the BET is set and, records the whole transaction and, Art's RIG only supplies one input per bet, only supplies an input after the BET is set and, records the whole transaction, and if Ed tries to claim that the BET was different, he will be prevented because (this gets complicated):

The terms of the BET include Art's RIG and Ed's RNS ID information which is recorded by Ed's RNS and Art's RIG.

Now, since Ed's RNS must have Art's RIG ID information entered before it supplies an RN, Art can demand to see Ed's RNS transaction record.

This record must reveal Art's RIG ID#.

Art can then say to Ed, "You acknowledged my RIG before the RN was supplied. Look at my RIG's transaction record and you will find the terms of the BET."

Ed can't deny this unless he claims that Art has tampered with or counterfeited his RIG. IF ED really thinks this is so, Ed can have the RIG inspected.

Hence, the terms of the BET, along with the proper RNS and RIG, constitute acknowledgement of the BET that can't be denied later by either party.

3) Art's employee enters the terms of the BET into Art's RIG.

4) The RIG only supplies one input per BET and only supplies an input after the BET terms have been set. A button is pressed when the BET terms are set and an input, a random number, is generated.

5) The RIG, records the above information.

6) Art's employee gives the input to Ed's employee. (The RNS only supplies an RN after the BET terms have been set.)

7) Ed's employee requires proof that Art's employee has acknowledged the BET. This proof is the same as in #2 above, with the roles reversed.

8) The RNS only supplies one RN per BET. Ed's employee enters the BET terms into the RNS.

9) Art's Input is entered into the RNS; an RN is supplied. 10) The RNS records all the above information.

11) The RN, the result of the BET is given to Art's employee. Along with the RN, a secret access code is supplied. As explained on page 67, a single access code corresponds to each purchase number in a given RNS. For anyone to verify that an RN is genuinely an IDRN, he or she must first give this access code to the company that can verify the RN.

12) Art's employee enters the secret access code and the result of the BET into the RIG, thereby recording this information and thus the whole transaction.

If a bet is executed as was just described, neither Ed's nor Art's employees can consciously influence the selection of the RN. The RN is really determined by two Random Number Generators, Art's RIG and Ed's RNS. The employees in the BET have no control, nor can they re-do a BET because the BET terms and result are fully recorded.

Elements Required in an EVPES When an EVPM Is Used to Speed Up the Movement of Lines To repeat from an earlier discussion, an EVPM can be used to speed up the movement of lines of people who have to pay for something. Such lines can move more quickly if fewer people have to pay. This goal can be accomplished with an EVPM. To make an EVPM practical in this situation, an Expected Value Payment Execution System must include the following means:

1) means for having each party in the line bet with the receiver of the payment,
2) means for insuring that bets are fair,
3) means for signalling whether the party in line has won or lost.

Further, the EVPES may have to include:

4) means for insuring that the party in line can't escape without paying if he or she has lost.

Embodiments follow without means for making sure that bets are fair. In the embodiments below, a public authority is handling the betting which gives a reasonable assurance that the bets are fair. Means for insuring that bets are fair have been discussed in previous sections of this application.

Toll Plaza

In a non-mechanical toll plaza, one that has a person taking payments, the toll person could simply have an RNS in his or her hand. The RNS would indicate whether a driver had to pay or not. Hence, each driver would stop at the booth and the toll person would either wave the driver on or tell him or her to pay.

Automatic Toll Plaza

Figure 3:
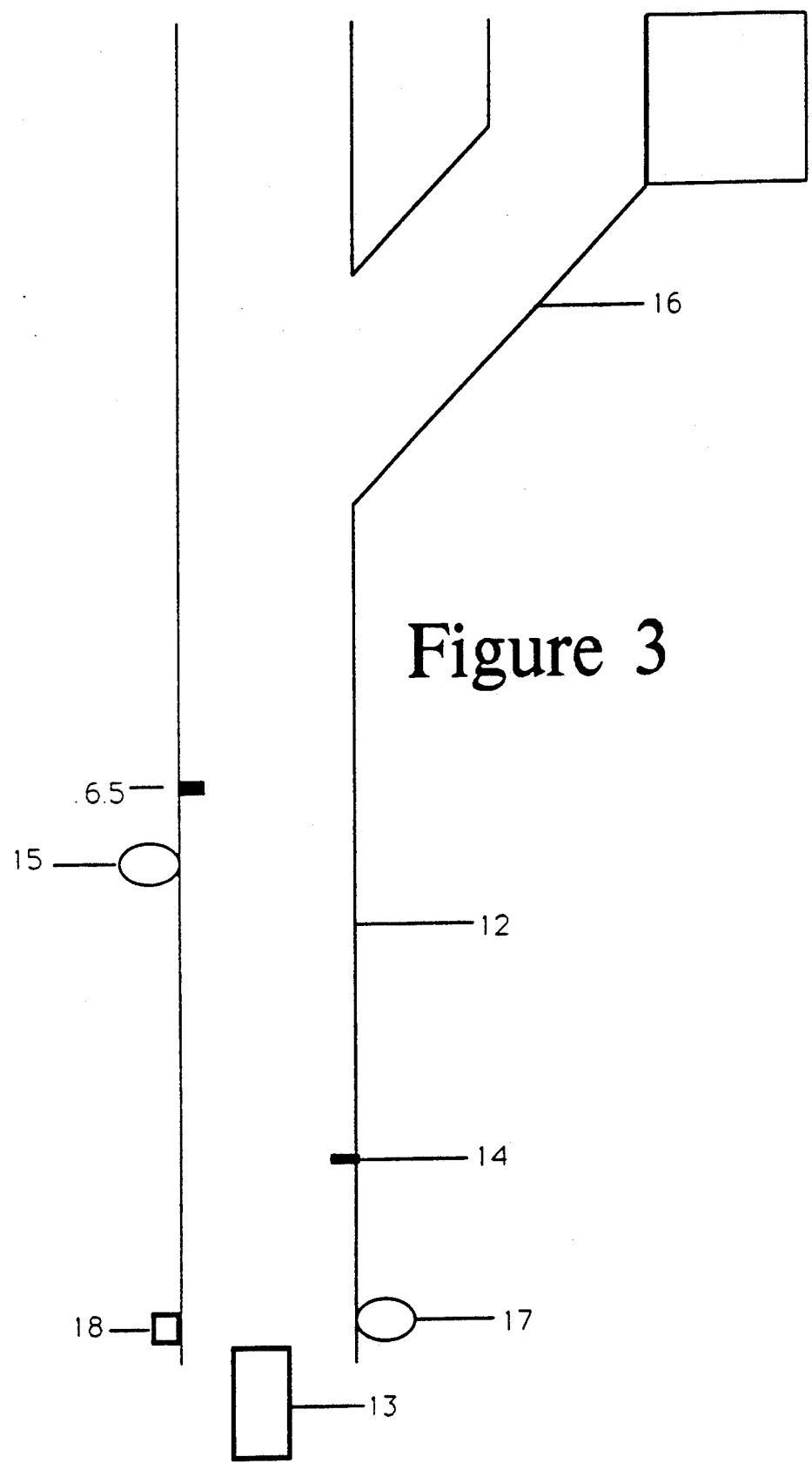
FIG. 3) A toll plaza enabling expected value payments.

Let us now consider an automatic toll system, as sketched in FIG. 3. There is a long lane of 60 feet 12 into which cars enter. There are signs well before the toll plaza telling drivers that they should keep one car length between each other (this advice is not absolutely necessary). A car enters the lane 13 and after 10 feet, passes a sensor 14 that includes the toll plaza's RNS which immediately decides the bet. If the driver loses, a sign 15, connected to the RNS, immediately lights up signalling the driver that he or she has to drive into the secondary, payment lane 16 and pay. When a losing car passes that sign, the sign turns off.

Many means are possible for insuring that a driver does not escape without paying. The means given in this example is simply a sign 17 informing the driver that a police camera 18 is recording his or her actions.

Subway System Entry System

Figure 4:
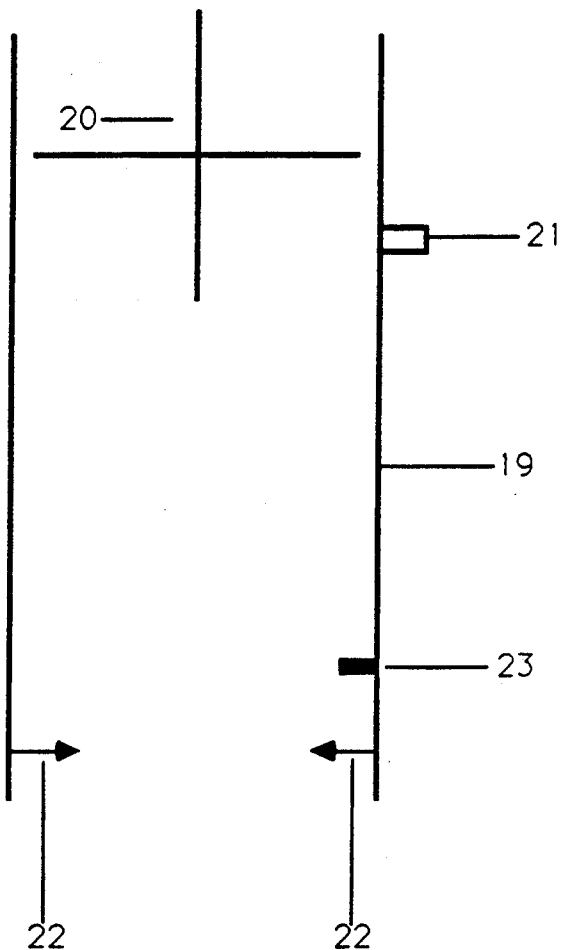
FIG. 4) A subway system entrance gate enabling expected value payments.

Let us now consider a subway system entry system, sketched in FIG. 4. There is a long entry way of 8 feet 19 into which a commuter enters. The turnstile 20 at the end of the entry way includes an RNS. A new bet is automatically decided by the turnstile RNS directly after a commuter passes through (we are assuming that in this subway system everybody pays the same amount). When a commuter tries the turnstile, he or she finds that it will turn, in which case the commuter has won the bet, or finds that it will not turn, in which case the commuter has lost the bet. If the commuter has lost, he or she must put a, say, $20 token into the turnstile 21. If the commuter loses, a gate 22, as in the kind used in the Washington, D.C. Metro, automatically closes behind the commuter, at the beginning of the entry way, to stop any escape. This gate is activated upon the commuter testing the turnstile and losing. The turnstile however, will not allow testing until a commuter enters the entry way and passes a sensor 23. This prevents cheating and by testing the turnsile from the exit side for confederates.

I claim:

1. In a payment by a first party of money to a second party for a commodity, a method of betting between a first party and a second party for the purpose of reducing currency handling requirements comprising the steps of:
   a. providing a denomination of currency, said denomination of currency representing a monetary amount equal to a plurality of smaller units of currency, wherein each smaller unit of currency has an integral value of "1";
   b. providing a means for randomly generating an integer from a set of consecutive integers, the number of different integers capable of being selected being equal to the total number of smaller units represented in said denomination of currency wherein said set of consective set of integers comprises integers starting at the smallest integer "1" and ending with the largest integer equal to the total number of smaller units represented in said demonination of currency;
d. representing the amount of money intended to be paid as an integer by converting the amount of money intended to be paid to smaller units;
e. operating said means for randomly generating an integer;
f. comparing the randomly generated integer with the amount of money integer intended to be paid, if said randomly generated integer is greater than amount of money integer intending to be paid, then said first party pays nothing to said second party and said first party receiving said commodity, if said randomly generated number is equal to or less than the amount of money integer intended to be paid, then the first party pays the second party said denomination of currency and said first party receiving said commodity.

* * * * *